Oct. 31, 1967        L. J. SELTORP        3,350,272
HETEROGENEOUS NUCLEAR REACTOR AND FUEL ELEMENT THEREFOR
Original Filed Oct. 9, 1961        3 Sheets-Sheet 1

INVENTOR
Leonard J. Seltorp
BY
ATTORNEY

United States Patent Office 3,350,272
Patented Oct. 31, 1967

3,350,272
HETEROGENEOUS NUCLEAR REACTOR AND
FUEL ELEMENT THEREFOR
Leonard J. Seltorp, Sharmarbinksvagen 6,
Enskede, Sweden
Continuation of application Ser. No. 145,530, Oct. 9,
1961. This application Apr. 12, 1965, Ser. No. 452,439
Claims priority, application Sweden, Oct. 28, 1960,
10,361/60
7 Claims. (Cl. 176—32)

This application is a continuation of my abandoned application Serial No. 145,530, filed October 9, 1961.

In constructing atomic reactors, especially those intended for power supply, there are four considerations which can be said to determine the advantages of the reactor, namely, the thermal performance, the burn-up figure, the specific heat effect figure and the material costs of the reactor. Besides there are some other factors to be taken into consideration but which are commonly to be regarded as of secondary significance.

From what is known hitherto no type of reactor can be said to satisfy all of the four considerations mentioned above. As an example it could be mentioned the well-known difficulties to reach any higher figures of reactor thermal performance by ceramically moderated reactors, the disadvantage with the low burn-up and so on.

The present invention concerns a heterogeneous type of reactor which makes it possible to reach a high thermal performance, a high and smooth burn-up simultaneously with the production of power as well as of plutonium, automatic exchange of fuel and, in consideration to the reactor volume, a high specific heat effect. Specially, it will be pointed out the high degree of burn-up possibly by this type of reactor, as the burn-up will not be limited here by the deformation of the fuel, because of enclosed fission gases, having been the case hitherto by other types of reactors.

The most important features of the invention are, that the fuel is caused to circulate between parts of the reactor having strong flux of neutrons and parts having less flux of neutrons, and that the fuel is predominantly in molten form. Fundamentally this could be carried out in two ways, for instance either by using special fuel elements, carried by a flowing medium having a specific gravity corresponding to that of the fuel elements, or the fuel is brought to circulation in special channels in the way and with the purpose as above. The fuel to be used can be: natural uranium, with or without enrichment, plutonium or thorium. Different reactor type performances are possible, owing to the purpose for which it has been constructed. In addition to the stationary version for generating power and heat, my type of reactor is also considered suitable for propulsion of ships and possibly even for aircraft.

The invention will now be further described in connection with the enclosed drawings in which.

The fuel elements could suitably have the shape of a ball. The external diameter of the fuel element ball, shown in FIGURE 1, is about 500 mm., but it could be subject to variations considering the reactivity, manufacturing procedure, specific gravity relations between the flowing medium and the external and internal ball.

Figure 1:
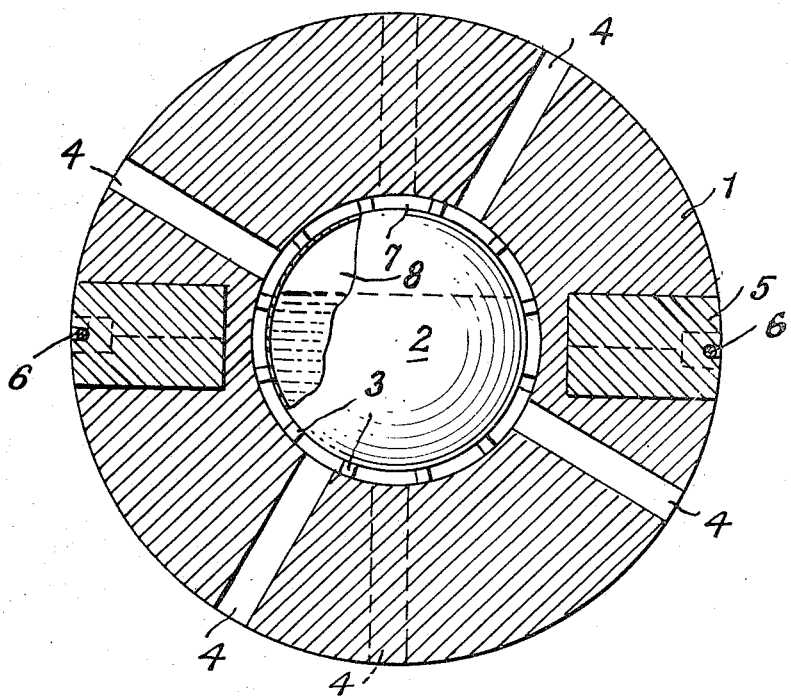
FIG. 1 shows an example of the fuel elements to be used with this reactor system.

The external part 1, in FIGURE 1, has been given a less specific gravity than the internal part 2. The different parts of the fuel element have been so adapted to each other, in regard to the specific gravity and dimensions, that the whole ball will float in the surrounding medium. Besides, said external part 2 could be made of some moderator material, as for instance silicon carbide coated graphite, having the specific gravity of about 1, 3 and should be further divided into two halves, so that the internal ball 2 could be easily removed or substituted when necessary. Moreover, the internal ball 2 is utilized as a container, and is kept in a certain distance from the external part by a number of supports 3, so that a spherical space 7 is created.

The supports 3 serve to fix the ball 2 within the shell 1 to provide flow passages therebetween for the coolant.

The surrounding medium flows through the channels 4 into the ball from one side and after having passed the fuel ball 2 it flows out again through the channels on the opposite side. The two external ball halves could be united by V-shaped wedges 5, kept in position by the peripherally encircling wire 6.

Figure 2:
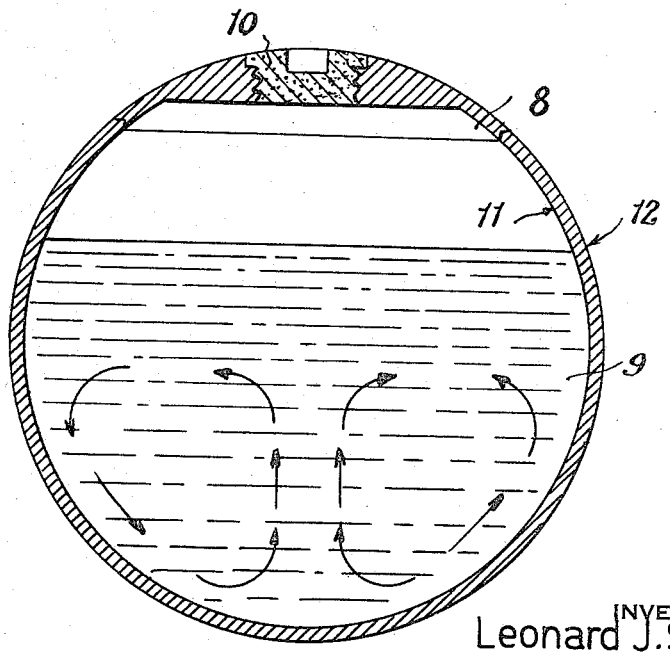
FIG. 2 is a sectional view through the inner fuel ball.

To reach the effect of always keeping the vacant space 8 in the same position in relation to a certain point of the ball cover, the gravity centre of the internal ball 2 is somewhat displaced to that of the external ball. The advantage hereof will be shown later on in connection with the description of the fuel ball shown in FIGURE 2.

In the central parts, generated fission heat, is diverted to the surrounding coolant medium, to a greater extent than the peripherally positioned parts, causing an increase of the temperature of the ball centre, thus giving some specific gravity variations of the fuel. For this reason, the flow will appear as shown by the arrows in FIGURE 2.

The fuel 9, used in this outlined example, consists of natural or somewhat enriched uranium with one weight-percent silicon. The silicon has the task of decreasing the fusing temperature of the uranium to about 950° C. as it in this proportion will form an eutecticum, further, to decrease the corrosion attacks of the uranium on the container material and to decrease the internal friction forces in the mixture through which the circulation will be facilitated. As previously pointed out, the fuel could partly consist of plutonium and thorium. Adding plutonium to the uranium can be easily carried out, as the fusing point of plutonium is only about 650° C. Thorium could suitably be added in the form of small pieces or granules, as its melting point (about 1750° C.) is too high for the chosen temperatures in the example referred to above. During the run of the reactor the temperature would be about 1200° C.

On the outside of the container wall, the heat will be transported out of the reactor by the passing coolant medium, which in this example consists of 95 weight-percent magnesium and 5 percent lead, giving a specific gravity of about 2.0. The average temperature of the coolant medium would be about 800° C.

The reactivity-restricting fission gases, generated in the fuel, rise to the surface and are collected in the vacant space 8, where they, by over-pressure in relation to the surrounding air, have been given the possibility to pass out from the container through a part of the container wall, suitably combined with a gas pervious charge plug 10, e.g. manufactured of alumina. The fission gases accompany the coolant medium and will then be separated from the same on the outside of the reactor tank. As the gravity centres of the fuel ball and the fuel element ball do not coincide, the porous plug will always be above the molten fuel. Otherwise, by over-pressure in the fuel ball, the fuel would be pressed out through the porous plug.

To combine the corrosion resistance, in relation to the fuel, with good heat transport ability, the container wall could suitably be built up in two layers 11 and 12 having such properties. The internal layer could be composed of zirconium carbide, alumina or zirconia and the external layer of graphite, zirconium, ceramic-metallic binding of silicon carbide-silicon, or beryllia. If graphite is used it should have an outside layer of silicon carbide. Finally, this could by flame spraying method be coated with a thin layer of molybdenum to increase the mechanical resistance.

Figure 4:
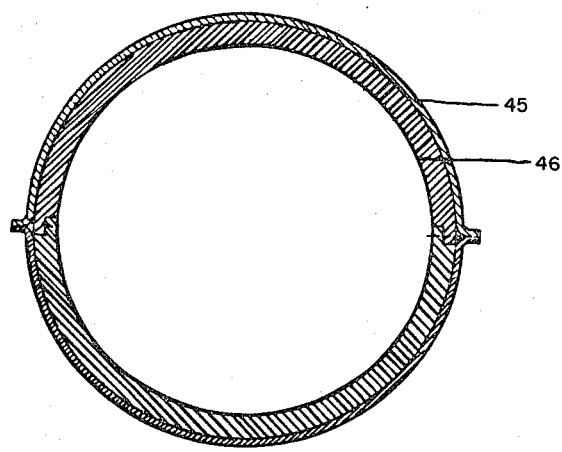
FIG. 4 is a sectional view through a modified type of fuel ball.

Another example of manufacturing the fuel elements is shown in FIGURE 4, where 44 is a capsule layer, eventually electrolytically coated, 45 is the fuel layer and 46 is a mechanical support layer for taking up outer pressure.

The neutron absorbing quantity of the coolant medium, which is simultaneously utilized as a carrying medium for the fuel elements could be reduced by about 50% by filling up the space between the elements with small homogenous balls, having a diameter of about ¹⁄₁₀ of that of the fuel element balls. These small balls could suitably be made of some moderator material as for instance silicon carbide coated graphite having the same specific gravity as the coolant medium. To increase the effect hereof further, the space between these moderator balls can be filled to about ⅓ with granules of a similar material and having a similar specific gravity. These granules are then included as a part of the coolant medium and circulate with the same to carry the heat out of the reactor tank, while the fuel elements and the moderator balls are only circulating within the said tank. By higher enrichment of the fuel, e.g. for propulsion of ships, the moderator balls and the graphite granules could be omitted.

Figure 3:
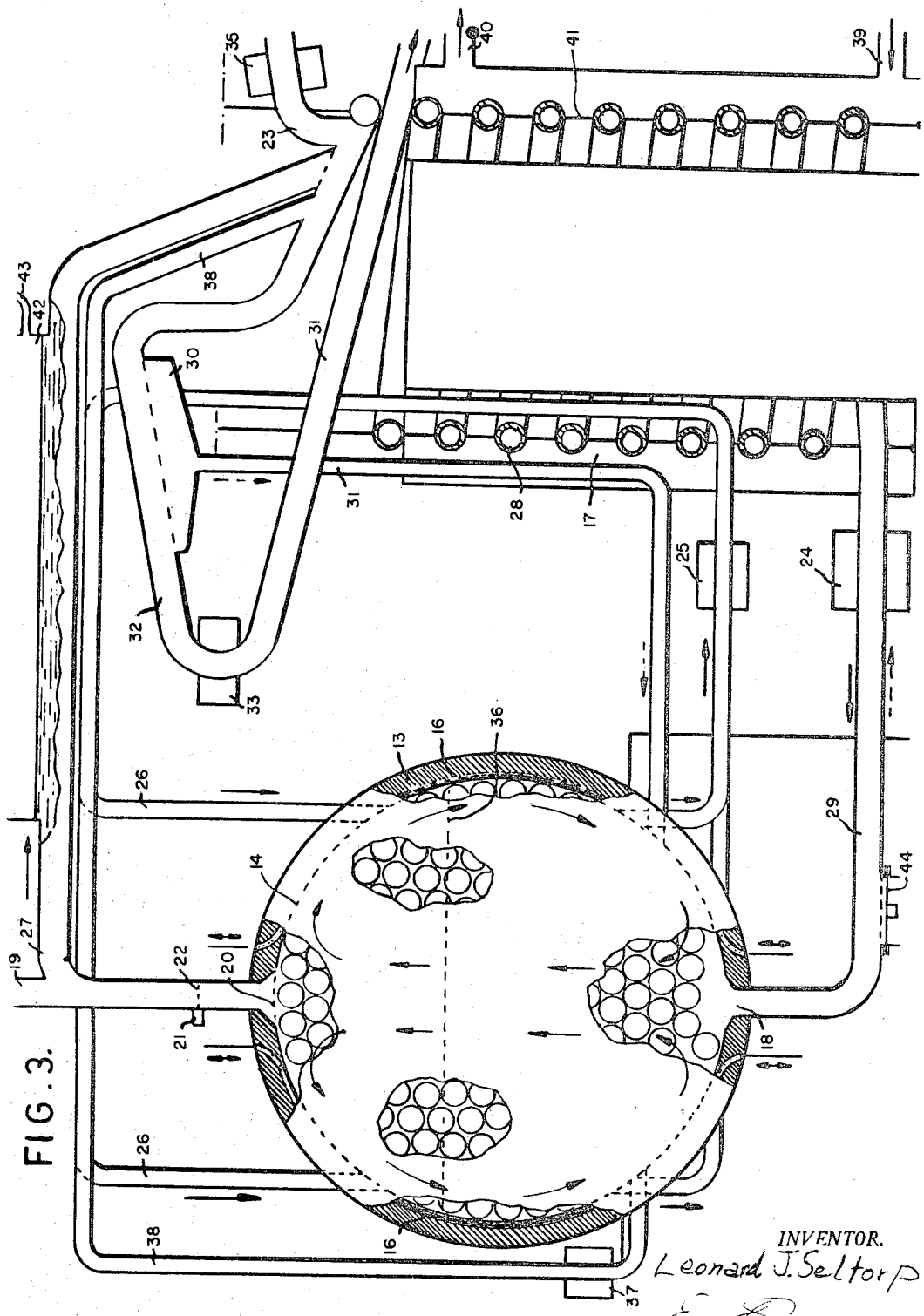
FIG. 3 shows a reactor constructed according to the invention.

In connection to FIGURE 3 the said circumstances will be further described. This figure shows an example of how a reactor, constructed as stated herein, could be built. The reactor tank 14 is manufactured of some high temperature resistant material having a low absorption cross section for thermal neutrons and which is corrosion resistant against the coolant medium. Outside the tank is the reflector 15, e.g. made of graphite or beryllia. The tank walls could be made relatively thin, as their task is to prevent the coolant medium from reaching the reflector. On the outer part of the reactor, where no consideration has to be taken to the neutron absorption, there is a pressure absorbing casing made of some high temperature resistant steel.

The necessary control and safety equipment for the run of the reactor, could consist of chains or ribbons running in metal covered channels in the reflector. The advantage hereof is that the aspired picture of the flow does not need to be disturbed.

As the fusing point of the coolant medium is about 650° C. it is necessary that all tubes are so equipped, that the coolant medium can be brought into molten form in another way than through fission heat. With the exception of that in the reactor tank existing medium, this could be attained by an electric resistance spiral arranged around the tubes. For that part of the tube system, situated in the heat exchanger 17 described below, the heating could be managed in a way that the therein existing secondary coolant medium will first be heated, and this, in its turn, may melt the primary coolant medium in the tube. The coolant medium in the reactor tank could be molten through the fission heat when the fuel element balls have been entered into the tank.

To fill the tank with different ingredients, in suitable proportions for the first reactor run, the following method should be applied. The inlet 18 of the main tube is blocked by a cast-plug of the same alloy as of the coolant medium. As the reactor has not been running, the packing may be manually carried out by being lowered down through the tube connection piece 19. In the same way the fuel element balls, the moderator balls, the graphite granules and the coolant medium (even this in granular form) can be lowered down. The advantage of this method is that the right number of fuel element balls and moderator balls, for which there is room in the tank, can be easily determined. After having finished the packing of the tank, the perforated blocking plate 20 is set in its place. The reactor is now ready to be started. Later as the coolant medium melts, it will be collected in the lower part of the reactor. Through the above-mentioned tube connection piece 19 more granules will be charged into the reactor until the gauge 21, by reaching the level 22, will deviate. The reason for this level will be explained later. The rest of the tube system will be filled with coolant medium through the tube 23.

When said stage has been finished, the main pump 24 and the pump 25, in the tube system 26, can be started. The pumps are, preferably of the electro magnetic type. If the pump direction by normal run is as shown by the continuous arrows, then the reactor tank heated coolant medium will pass out through the main tube 27, down through the tube spiral 28, where the fission heat will be delivered and will then return to the tank through the tube 29. This flow gives a circulation driving effect in the arrow direction to the reactor contents. To amplify this effect, the coolant medium is brought to flow tangentially into the tank through the tube system 26. Depending on the size of the reactor, the number of tangential tubes presented could be 8–12, peripherally evenly dispersed and connected upwardly and downwardly into connection rings. This circulation between the strong neutron flux in the centre and the less strong peripheric neutron flux, gives a smooth burn-up to all the included fuel.

Figure 5:
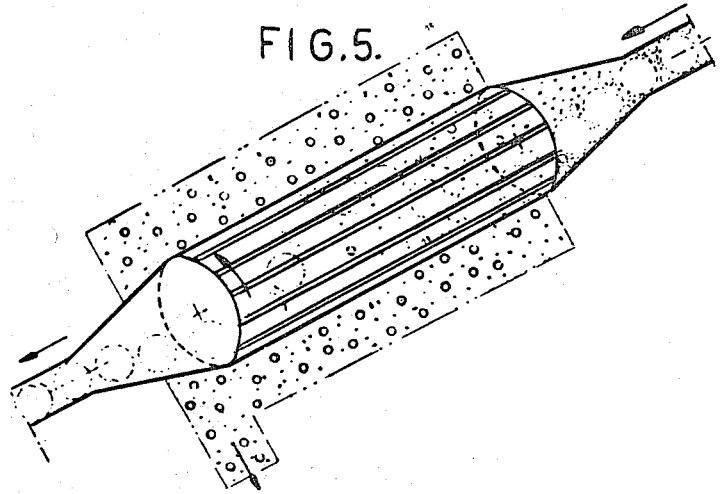
FIG. 5 illustrates a centrifugal arrangement for the separation of the balls.

To avoid the fuel elements and the moderator balls from accompanying the coolant medium out from the reactor tank by normal run, all outlet openings are blocked with perforated plates 20, e.g. made of graphite. By fuel change the flow direction of the coolant medium will be transported through the tube spiral 28, up to a level situated over the level 22, which level the coolant medium will take when the pumps are switched off. In the separator 30, the coolant medium, the moderator balls and the granules will thereby be separated from the fuel element balls and return to the tank through the tube 31. The separation could also be considered to be carried out by using the centrifugal principle as shown in FIGURE 5. The fuel element balls continue through the tube 32, passing a counter 33 to indicate that all balls have left the reactor tank, and will then roll through the tube 34 to a conveyor for further transport to the refuse store.

The new fuel element balls will also pass a counter 35, to check the number of these entering balls to make certain that the number is the same as of those which were transported to the refuse store. Then, the new fuel element balls pass the tube 23 and enter into the system.

From a tube outlet in the reactor tank and situated under the dotted line 36, which line refers to the level of the reactor contents when the tank is empty of fuel element balls, the transport medium, consisting of only coolant medium, will be pumped by the pump 37 through the tube 38 and carry the new fuel element balls in the normal direction of coolant medium flow into the reactor tank.

As previously pointed out, the tube spiral 28, for transporting the fuel element balls up and down, can preferably be utilized as a heat exchanger. The secondary coolant medium, e.g. consisting of 44.5% lead and 55.5% bismuth and having a fusing point of 125° C., can then be entered through the tube 39 and pass out through the tube 40. If this secondary coolant medium has about the same specific gravity as the tube spiral mentioned above, the latter could be regarded weight-less in relation to the suspension point, which to a great extent will contribute to decrease the heat stresses.

For the same purpose, the spiral can be freely suspended between the bottom of the surrounded tank and the ceiling, i.e. every turn of the tube spiral is connected with movable links 41, having a certain amount of freedom in the vertical as well as in the horizontal direction.

The secondary coolant medium in this example will, through the specific gravity relation, give the tube spiral a small force upwards, giving the tube spiral a tendency to float upwards if it were not held in place by the above-mentioned links. Owing to the cooling effect and thereby following rather heavy temperature gradient in the flow direction, the thermal stress will exert influence to give the different tube turns varying diameters. By the system mentioned above, using movable tube turns, the dangerous stresses will be eliminated. This spirally formed construction, being used for transportation, as well as for heat exchange, could naturally be performed in other ways.

As shown in FIGURE 3, no valves are necessary in this system, which may be regarded as a great advantage, as it would certainly be a matter of great difficulty to get such valves to function capably under working temperatures of 800° C. or more. If the system, however, has to be emptied for inspection or any other reason, this can be managed by bursting the diaphragm 44, in the lowest point of the system, but first after having emptied the reactor tank of fuel element balls. The fission gases, which, through the porous top lid 9 in FIGURE 2, have come out in the coolant medium, will follow same out from the reactor tank. In the separator 42 they will be separated and led through the tube 43 to special designed collecting tanks.

What I claim is:

1. In a heterogeneous reactor, an at least substantially spherical reactor tank having parts wherein the neutron flux is strong and parts wherein the neutron flux is of less strength, means by which a whirling motion of fuel elements within a coolant in a molten state is created within the tank from radially innermost portions thereof and vice versa to cause all fuel of all of the fuel elements to reach a smooth and high burn-up, and in which the fuel elements are at least partly hollow bodies containing a fuel in at least a partly molten state, said fuel elements having a spherical outer housing and an inner container also of spherical form, the inner container being supported within the outer container by means of separated spacing elements to thereby maintain spherical spacing between the inner container and the outer housing, coolant medium channels extending radially through the outer housing and communicating with said spherical spacing, molten fuel contained in the inner container and partially filling the same, and a gas-pervious portion in the inner container maintained in a position above the molten fuel in the inner container, the specific gravity of said bodies being at least substantially equal to that of the coolant in which said elements are carried, such as by varying the dimensions of said bodies in relation to the volume of the hollow space therein.

2. In a heterogeneous atomic reactor, a fuel element having a spherical outer housing and an inner container also of spherical form, the inner container being supported within the outer container by means of separated spacing elements to thereby maintain spherical spacing between the inner container and the outer housing, coolant medium channels extending radially through the outer housing and communicating with said spherical spacing, molten fuel contained in the inner container and partially filling the same, and a gas-pervious portion in the inner container maintained in a position above the molten fuel in the inner container.

3. In a heterogeneous atomic reactor as provided for in claim 2, wherein the gas-pervious portion is composed of an alumina plug, permitting gas generated within the inner container to pass through said plug but not permitting the coolant medium to enter the inner container due to the surface tension exerted by the coolant medium on the alumina.

4. In a heterogeneous atomic reactor as provided for in claim 2, wherein the center of gravity of the inner fuel container is arranged so that the plug will always be positioned so that fission gases within the container can be forced out through the body of said plug.

5. In a heterogeneous reactor, a substantially spherical reactor tank having parts wherein the neutron flux is strong and parts wherein the neutron flux is of less strength and in which tank fuel elements in the shape of at least partly hollow bodies each containing fuel in a molten state, are carried by a flowing medium of substantially the same specific gravity as that of the fuel elements, means by which a whirling flow of said flowing medium and said elements carried thereby is created within the tank to cause all fuel to reach a smooth and high burn up.

6. In a heterogeneous reactor according to claim 5, with the tank containing moderator balls and graphite particles; pump means for circulating the coolant medium through heat exchanging means and returning it tangentially to the tank, pump means for altering the direction of fuel flow to draw the reactor contents out of the tank and elevating said contents above a normal operating content level in the tank, a separator to which the tank contents are brought wherein the coolant medium, the moderator balls and the granules are separated from the fuel element balls and returned to the tank, and means for carrying away the fuel element balls.

7. In a heterogeneous reactor according to claim 5, said tank further containing moderator balls and graphite granules, heat exchanging means, means for circuating the coolant through the heat exchanging means and back to the tank, means for altering the flow of fuel direction to draw the reactor tank contents out of the tank, and separating means by which the fuel element balls are separated from the other elements, with such other elements being returned to the tank and the fuel element balls being carried away from the tank.

References Cited
UNITED STATES PATENTS

| | | | |
|---|---|---|---|
| 3,046,212 | 7/1962 | Anderson | 176—45 |
| 3,058,897 | 10/1962 | Slack et al. | 176—45 |
| 3,089,835 | 5/1963 | Schulten et al. | 176—32 |
| 3,098,809 | 7/1963 | Huet | 176—81 |
| 3,142,625 | 7/1964 | Wellborn | 176—32 |
| 3,142,626 | 7/1964 | Wellborn | 176—67 |

L. DEWAYNE, RUTLEDGE, *Primary Examiner.*